3,679,584
OVERBASED ALKALINE EARTH METAL SULFO-
NATE LUBE OIL COMPOSITION MANUFACTURE
Walter W. Hellmuth, Beacon, N.Y., assignor to
Texaco Inc., New York, N.Y.
No Drawing. Filed June 1, 1970, Ser. No. 42,514
Int. Cl. C10m 1/54, 1/10
U.S. Cl. 252—33.4                                    3 Claims

ABSTRACT OF THE DISCLOSURE

A process for increasing the alkaline earth metal ratio of an alkaline earth metal carbonate overbased alkaline earth metal sulfonate lubricating oil composition comprising introducing into a lubricating oil medium containing a colloidal-like dispersion of an alkaline earth metal carbonate overbased alkaline earth metal sulfonate, an alkaline earth metal hydroxide and boric acid and subsequently contacting the resultant mixture with carbon dioxide.

BACKGROUND OF INVENTION

In coassigned U.S. Patent No. 3,480,548 there is disclosed a boronated alkaline earth metal carbonate overbased alkaline earth metal sulfonate lube oil composition which is prepared by contacting an alkaline earth metal carbonate overbased alkaline earth metal sulfonate in hydrocarbon lubricating oil with a boron compound, e.g., boric acid. This procedure is theorized to convert the surface of the alkaline earth metal carbonate ingredient particles to an alkaline earth metal polyborate. The resultant polyborate coated carbonate particles release their acid neutralizing carbonate in automotive engine operation in a more controlled manner than non-boronated particles, thereby resulting in an improvement in rust and oxidation inhibition over the uncoated alkaline earth metal carbonate overbased sulfonate lube compositions. Although this prior boronating procedure improves the rust and oxidation inhibiting properties of such compositions, it is of continued interest from an economic standpoint to obtain maximum filterable alkaline earth metal ratios for sulfonate type of surfactants. In the past there was no satisfactory means of increasing the degree of alkaline earth alkalinity (overbase ratio) of already manufactured lube oil containing dispersible alkaline earth metal carbonate overbased sulfonate in the absence of the formation of undesired gels and/or extensive inorganic salt precipitate.

SUMMARY OF INVENTION

I have discovered and this constitutes my invention a process of enhancing the alkalinity, i.e., increasing the alkaline earth metal ratio of a colloidal dispersion in lubricating oil of an alkaline earth metal carbonate overbased alkaline earth metal sulfonate while simultaneously imparting thereto the desired alkaline earth metal polyborate coating on the alkaline earth metal carbonate dispersion, resulting in a product of substantially improved corrosion and rust inhibiting potential per unit volume. More specifically, the invention pertains to a process incorporating in a hydrocarbon lube oil composition containing a coloidal dispersion of alkaline earth metal carbonate overbased alkaline earth metal sulfonate, an alkaline earth metal hydroxide and boric acid and subsequently contacting the resultant mixture with carbon dioxide.

DETAILED DESCRIPTION OF THE INVENTION

Hereinbefore and hereinafter the term "overbased" denotes excess equivalents of alkaline earth metal moiety over the number of equivalents of sulfonic moiety, said excess contributed by the inorganic salt components of the initial and final lube oil compositions. The term "normal" refers to an alkaline earth metal ratio of one. "Alkaline earth metal ratio" is the ratio of the number of equivalents of alkaline earth metal moiety to the number of equivalents of sulfonic acid moiety in the lube oli composition.

Further, the term "alkaline earth metal carbonate overbased alkaline earth metal sulfonate" when used in the context of a lube oil composition refers to colloidal-like dispersion of the overbasing alkaline earth metal carbonate in the lube oil medium with the normal alkaline earth metal sulfonate functioning as the dispersing agent. Still further, the term "boronated overbased alkaline earth metal sulfonate" refers to a colloidal-like dispersion of an alkaline earth metal polyborate coated alkaline earth metal carbonate in lube oil.

In brief theory of the functioning of the alkaline earth metal carbonate and boronated alkaline earth metal carbonate overbased alkaline earth metal sulfonate-lube oil compositions is the normal alkaline earth metal sulfonate moiety functions to disperse the ordinarily oily insoluble particles of alkaline earth metal carbonate and boronated alkaline earth metal carbonate into a colloidal-like dispersion in the lubricating medium. The alkaline earth metal carbonate in lubricating oil system acts to neutralize acidic bodies, e.g., those found in engine exhaust gases, coming in contact therewith as a result of automotive engine operation. The more oil dispersible alkaline earth metal, i.e., the greater the alkaline earth metal ratio per composition volume the more neutralizing power per volume and when in a concentrate the greater the amount of dilute final product which can be produced. The polyborate coating on the alkaline earth metal carbonate functions to control the release of the alkaline earth metal carbonate neutralizing power more slowly in the system thereby increasing its effectiveness in inhibiting corrosion and oxidation. The presence of the borate anion also contributes significantly to the rust protection properties of the overbased formulation.

Specifically, I have discovered a method of increasing the oil dispersible metal ratio of an overbased alkaline earth metal sulfonate while simultaneously coating the alkaline earth metal ratio producing agent with a boronated neutralizing control material resulting in a product of substantially greater corrosion and oxidation inhibiting properties.

More specifically, the process comprises first forming a mixture, preferably under agitation conditions, of colloidal-like dispersion of alkaline earth metal carbonate overbased alkaline earth metal sulfonate in hydrocarbon lubricating oil having an alkaline earth metal ratio of between about 2:1 and 18:1, alkaline earth metal hydroxide, boric acid and also preferably volatilizable liquid diluent which functions not only to render the reaction mixture more fluid but to facilitate the removal of the water by-product, e.g., via a subsequent azeotropic distillation. The formed mixture is contacted, preferably by bubbling therethrough, with carbon dioxide at a temperature between about 50 and 150° C. utilizing a total amount of carbon dioxide in stoichiometric excess in respect to reaction with said boric acid and alkaline earth metal hydroxide, e.g., between about 2 and 100 equivalents of carbon dioxide per total equivalent of alkaline earth metal hydroxide and boric acid. Under preferred conditions, the mixture prior to carbon dioxide contacting is heated to reflux (when volatilizable diluent is present) for a period of 0.5 to 10 hours, e.g., 1 hour and the time of carbon dioxide introduction is 0.1 to 25 hours, e.g., 1.25 hours. The resultant product is a crude boronated alkaline earth metal carbonate overbased alkaline earth metal sulfonate colloidal-like dispersion in the reaction medium. The crude product is desirably purified normally by standard means such as stripping off the volatile diluent and water by-product, purging with an inert gas, e.g., nitrogen, adding a diatomaceous earth filter aid, pressure filtering the mixture, and recovering purified boronated overbased alkaline earth metal sulfonate colloidal-like dispersion in lube oil of an alkaline earth metal ratio greater than the metal ratio of the overbased reactant. Under advantageous conditions, the filter cake resulting from the filtration is washed with a volatilizable hydrocarbon to recover additional boronated overbased sulfonate lube oil composition with the volatilizable solvent being subsequently removed via distillation and the recovered residue combined with the initial filtrate.

In the foregoing procedure, the use of boric acid employed in the reaction mixture is material for the procedure to successfully produce the desired alkaline earth metal ratio enhanced boronated overbased sulfonate composition. Specifically, the advantageous mole ratio of boric acid to alkaline earth metal hydroxide is generally of between about 2:1 and 1:2 but also is dependent on the nature of the sulfonic acid ingredient employed. Some sulfonic moieties permit only a narrow mole range such as between about 2:1 and 1:1. When boric acid is not a co-reactant there is little or no increase in the oil dispersible, filterable alkaline earth metal ratio. Further, the additional alkaline earth carbonate formed in the reaction is a useless fine precipitate which functions only to block the filtering mechanism and does not add to corrosion and oxidation inhibiting properties. When too much boric acid is used, the resultant product forms a gel and is rendered non-filterable for recovery of the purified product.

Another important feature in the invention is the employment of carbon dioxide in an amount as heretofore defined, since without its use there is essentially no increase in filterable alkaline earth metal alkalinity values except for that associated as $CaB_2O_4$ overbasing. Equivalent ratios of carbon dioxide to alkaline earth metal hydroxide less than that required to carbonate the metal hydroxide which is not reacted with the boric acid results in an overbasing ratio lower than theoretical.

In the preparation of the compositions contemplated herein the lubricating oil medium can operably constitute between about 5 and 95 wt. percent of the initial reaction mixture and desirably between about 50 and 80 wt. percent in the final composition, the remainder of the final composition being essentially the boronated overbased alkaline earth metal sulfonate dispersion. Suitable base oils useful in the composition of the invention as well as diluent in the manufacture of the compositions include a wide variety of hydrocarbon lubricating oils such as naphthenic base, paraffinic base and mixed base mineral oils. In addition, hydrocarbon lubricating oils, e.g., alkylene polymers such as polypropylene and polyisobutylene of a molecular weight of between about 250 and 2500 are also contemplated. Advantageously, hydrocarbon lubricating base oils having an SUS viscosity at 100° F. between about 50 and 2000 are employed.

The values of initial ingredients are normally adjusted to result in a lubricant composition wherein the overbased sulfonate component consists of normal alkaline earth metal sulfonate of about 1 to 98 wt. percent, alkaline earth metal polyborate content of between about 1 and 70 wt. percent and an alkaline earth metal carbonate content between about 1 and 70 wt. percent. The higher additive concentration lubricating oil compositions of the invention, e.g., those containing between about 20 and 90 wt. percent of boronated overbased alkaline earth metal sulfonate are generally the direct product in the manufacture of the lubricant composition and are referred to in the art as concentrates. The compositions produced by the method of the invention are prepared as a concentrate primarily to facilitate interaction between reactants and for obvious storage and handling reasons as well as for facility in making up diluted lubricant compositions most suitable for use under automotive conditions. In automotive lubricating oil conditions the boronated overbased alkaline earth metal sulfonate normally constitutes between about 0.1 and 10 wt. percent, preferably between about 0.1 and 5 wt. percent of the composition and are prepared by diluting the concentrate with additional hydrocarbon lubricating oil and adding other lube oil additives, if desired. In any event, whether the lubricant compositions of the invention be in their concentrate or dilute form, they will at least have some lubricating ability with improved detergent, antioxidant and anti-corrosive properties.

In the finished lubricating oil compositions other additives may be included. These other additives can be any of the standard suitable pour depressors, additional sludge dispersants, antioxidants, corrosion inhibitors, viscosity index improvers, friction modifiers. Exactly what other additives are included in the finished oil in the particular amount thereof will, of course, depend on the particular use and conditions of use desired for the finished oil product.

Suitable examples of the oil soluble hydrocarbon sulfonic acid moiety in the alkaline earth metal sulfonate ingredient are those having an average molecular weight between 300 and 2000. The oil soluble sulfonic acids are in turn derived from natural (e.g., petroleum) or synthetically manufactured hydrocarbons or mixtures thereof. Typical oil soluble sulfonic acids contemplated herein include petroleum sulfonic acids such as mahogany sulfonic acid, alkylated aromatic sulfonic acid, petrolatum sulfonic acids, paraffin wax sulfonic acids, petroleum naphthene sulfonic acids, polyalkylated (e.g., polyisobutylene) sulfonic acids, mono- and polywax and other alkyl substituted benzene sulfonic acids, mono- and polywax and other alkyl substituted naphthalene sulfonic acids, mono- and polywax or other alkyl substituted cycloalkyl (e.g., cyclohexyl) sulfonic acids and mixtures of the foregoing. Preferably, the sulfonic acids employed will have been derived from the sulfonation of a petroleum fraction or a synthetic hydrocarbon or mixtures thereof. It will be a monosulfonic acid having a molecular weight between about 450 and 550, most preferably about 500 but the molecular weight of the sulfonic acid can be as low as 300 or as high as about 2000 for making sufficiently oil soluble sulfonates. By "oil soluble" we mean soluble in a conventional mineral lubricating oil fraction to the extent of at least about 5 wt. percent.

In ordinary instances the oil soluble sulfonic acid employed in the preparation of the alkaline earth metal carbonate overbased alkaline earth metal sulfonate initial ingredient is supplied from sulfonation of petroleum or synthetic hydrocarbon oil stocks and is diluted by an oily water immiscible organic medium for which most cases will be a petroleum hydrocarbon or synthetic hydrocarbon lubricating oil fraction, a gas oil fraction or even a lighter cut such as benzene solvent or a solvent naphtha in order to facilitate the handling and interaction with reactants. The aforedescribed oil soluble sulfonic acid precursors are converted to the alkaline earth metal carbonate overbased alkaline earth metal sulfonate reactant by standard procedures known in the art. For example, one procedure calls for first forming the normal alkaline earth metal sulfonate. This can be accomplished by reacting the sulfonic acid with an alkali metal base such as alkali metal hydroxide to form normal alkali metal sulfonate, then reacting the formed normal alkali metal sulfonate with an aqueous alkaline earth metal salt solution, e.g., alkaline earth metal fluoride to form the normal alkaline earth metal sulfonate. Another way to form the normal alkaline earth metal sulfonate precursor is to directly neutralize the oil soluble sulfonic acid with an alkaline earth metal hydroxide, oxide or hydroxide. The resultant salt is a normal alkaline earth metal sulfonate. The thus formed normal alkaline earth metal sulfonate can then be overbased by the addition of alkaline earth metal hydroxide, oxide or hydrated oxide and the resultant mixture is blown with carbon dioxide to convert the additionally added inorganic earth metal compound to an alkaline earth metal carbonate, thus supplying the overbasing.

Alternative to the foregoing procedure, the overbased alkaline earth metal sulfonate component may be prepared by combining a lubricating oil medium sulfonic acid and an alkaline earth metal hydroxide, oxide or hydrated oxide in excess of what is required to neutralize the sulfonic acid and blowing the resultant mixture with carbon dioxide at a temperature to form the overbased alkaline earth metal sulfonate.

Methods of preparing the alkaline earth metal carbonate overbased alkaline earth metal sulfonate reactants contemplated herein are further described in U.S. 3,027,325, 3,057,896, 3,105,049, 3,152,991, 3,155,616, 3,223,630, 3,325,494, 3,256,186, 3,262,880 and 3,312,618.

Specifically, examples of the overbased alkaline earth metal sulfonate reactants contemplated herein are calcium carbonate overbased sulfonates having a calcium metal ratio of 12, 15 and 18, barium carbonate overbased barium sulfonate having a barium metal ratio of 13, 16 and 19, magnesmium carbonate overbased magnesium sulfonate having a magnesium ratio of 14, 16 and 18, said sulfonates derived from an oil soluble petroleum and synthetic hydrocarbon alkylated sulfonic acid mixture of a molecular weight of about 500.

Suitable examples of the alkaline earth metal hydroxides contemplated herein are calcium hydroxide, barium hydroxide and magnesium hydroxide.

Examples of hydrocarbon diluent and azeotroping agents for use in the preferred procedure of the method of the invention as well as for washing the filter cake if filtration is employed are toluene, xylene, isooctane, decane, methanol and mixtures thereof.

Specific examples of the boronated overbased alkaline earth metal sulfonates contemplated herein are calcium polyborate coated calcium carbonate-calcium sulfonate having a boron to calcium mole ratio of 2:9, and a calcium metal ratio of 27:1; barium polyborate-barium carbonate overbased barium sulfonate having a barium metal ratio of 3:1, a boron to barium ratio of 1:2 and a boron to carbonate ratio of 1:1; and a magnesium polyborate-magnesium carbonate overbased magnesium sulfonate having a magnesium metal ratio of 18, a boron to magnesium ratio of 1:3 and a boron to carbonate ratio of 2:5, the sulfonates being derived from an oil soluble petroleum sulfonic acid of a molecular weight of 475±25.

In brief explanation, the alkaline earth metal polyborate coating formed in the method of the invention is of the empirical formula $MB_xO_{1.5x+y+1}H_{2y}$ where M is an alkaline earth metal moiety such as calcium, barium and magnesium, $x$ is an average integer of from 1 to 20 or higher usually from 2 to 8, $2x$ is greater than $y$ and $y$ is an average integer equal to or greater than 0. The integers $x$ and $y$ are defined as average since in the preparation of the compositions a complex mixture of alkaline earth metal polyborates are normally formed such as alkaline earth metal metaborates, diborates, tetraborates, hexaborates and etc. Polyborates may be described as metal salts of polyboric acid, polyboric acid being described as condensed acids formed by the removal of at least some water from the condensation of two or more moles of orthoboric acid. Polyborate and polyboric acids are further described in Mellor, "A Comprehensive Treatise on Inorganic and Theoretical Chemistry," vol. 5, pages 1–149, 47 (1929).

The following examples further illustrate the process of the invention but are not to be construed as limitations thereof.

Example I

This example illustrates the method of the invention.

To a 2 liter reactor fitted with variable speed stirrer, means for heating, means for collecting volatile overhead and means for gas purging, there are charged 200 grams of a hydrocarbon lubricating oil solution containing 50 wt. percent calcium carbonate overbased calcium sulfonate derived from an oil soluble hydrocarbon sulfonic acid of a molecular weight of about 400 having an analysis as follows:

| Tests: | Results |
| --- | --- |
| Calcium, total percent wt. | 11.9 |
| Total base number (HClO$_4$) | 295 |
| Specific gravity, 60/60° F. | 1.1112 |
| Calcium metal ratio | 18 |

There is additionally charged to the reactor 23.8 grams of calcium hydroxide, 11.4 grams boric acid, 293 grams of paraffinic lubricating oil of an SUS viscosity at 100° F. of 102, 150 mls. of methanol, and 450 mls. of isooctane. Agitation of the reaction mixture is instituted and the reaction mixture is heated at reflux (∼100° C.) over a period of .3 hour. At the end of the reflux period carbon dioxide was then bubbled through the reaction flask contents over a 1.25 hour period at reflux temperature, the rate of addition being 500 mls./min. and controlled in a manner to avoid foaming over. The total amount of carbon dioxide addition is ∼5 equivalents per equivalent of alkali metal hydroxide reactant. During the passage of the carbon dioxide through the reaction mixture both excess carbon dioxide and H$_2$O were continuously vented from the reactor. At the end of the carbon dioxide contact period the temperature of the reaction was increased to 180° C. and isooctane, methanol-water azeotrope and excess methanol were recovered as overhead and in the final phase of this stripping operation nitrogen gas was passed therethrough for a period of 0.25 hour. To the resultant stripped residue 35 grams of diatomaceous earth filter aid were added and the resultant mixture was filtered through a pressure filter at 40 p.s.i. There were obtained 460 grams of filtrate. The formed filter cake was washed with 1400 mls. of isooctane and the isooctane was stripped by aspirator at 150° C. to give an additional 60 grams of filtrate which equals the combined filtrate of 520 grams. The filtrate product was analyzed and determined to be a lubricating oil composition containing ∼25 wt. percent of a boronated calcium carbonate overbased calcium sulfonate of the following specific analysis:

| Tests: | Results |
| --- | --- |
| Calcium, total, wt. percent | 6.83 |
| Calcium basis (HClO$_4$), wt. percent | 6.3 |
| Boron, wt. percent | 0.38 |
| CO$_2$, wt. percent | 5.6 |
| Ca metal ratio | ∼27 |
| B/Ca mole ratio | ∼2:10 |
| B/CO$_3$ mole ratio | ∼2:7 |
| TBN (HClO$_4$) | 177 |

Example II

This example illustrates the criticality of employing boric acid to enhance the alkaline earth metal ratio.

To a 2 liter reactor equipped as in Example I, 200 grams of a hydrocarbon lubricating oil solution containing ∼50 wt. percent calcium carbonate overbased calcium sulfonate which analyzed 13.0 wt. percent calcium and having a calcium metal ratio of ∼18 was charged. Additionally 24.0 grams of Ca(OH)$_2$, 296 grams of paraffinic lubricating oil of an SUS viscosity at 100° F. of 102, 150 mls. methanol and 450 mls. of isooctane were charged. The mixture was heated at reflux 0.3 hour and then for 1.25 hours. Carbon dioxide was bubbled through at 500 mls./min. At completion of this time, the mixture was stripped at 180° C. Then 35 grams of diatomaceous earth were added, and the resultant slurry was filtered through a pressure filter at 40 p.s.i. The product obtained (438 grams) was analyzed and found to contain 5.5 wt. percent filterable calcium and of a metal ratio of 20:1. Since theoretical calcium was 7.4 wt. percent, and of a calcium metal ratio of 27:1 it was obvious that the desired increase in overbasing ratio had not been obtained when boric acid was not employed as a reactant.

Similarly, 2000 grams of the calcium carbonate overbased calcium sulfonate described above were charged to a 12 liter reactor along with 2330 grams of the same paraffinic lubricating oil, 229 grams of $Ca(OH)_2$, 126 grams $H_3BO_3$, 3000 mls. isooctane and 1000 mls. of methanol. The reactants were heated at reflux for 1 hour, the $CO_2$ introduced at the rate of 1330 mls./min. for 2 hours. Subsequently all volatile components were removed by stripping to 180° C., 140 grams filter aid added and stirred .33 hour at 180° C. The material was filtered under 40 p.s.i. to give 4220 grams of filtrate. The filter cake was then washed with isooctane and the solvent removed under vacuum at 125° F. to give an additional 293 grams of filtrate which equals a combined total of 4513 grams. This was analyzed and determined to be a lubricating oil composition containing approximately 25 wt. percent of a boronated calcium carbonate overbased calcium sulfonate. The following analysis in comparison to the previous run indicates that boric acid was critical in obtaining an increase in metal ratio of the product.

| Test: | Result |
| --- | --- |
| Percent Ca, total wt. percent | 8.1 (8.2 calc.) |
| Percent B, wt. | .47 (.48 calc.) |
| Percent $CO_2$ wt. | 6.6 |
| Kin. Vis. at 100° F. | 41.2 cs. |
| Percent calcium sulfonate | 7.2 |
| Calcium metal ratio | ~27 |
| B/Ca mole ratio | 2:5 |
| B/$CO_3$ mole ratio | 1:4 |

Example III

This example further illustrates the significance of the quantity of boric acid employed of less than about 2:1 and more than about 1:2 by a comparison of four preparations using 5:1, 2:1, 1:1 and 1:2 wherein both extremes did not afford a useful detergent concentrate but at the intermediate mole ratios, such a concentrate could be formed:

5:1 ratio.—Three hundred grams of a 12:1 overbased calcium sulfonate (12 wt. percent Ca), 15.4 grams Ca$(OH)_2$, 60.6 grams $H_3BO_3$, 401 grams diluent oil described previously and 300 mls. of isooctane plus 100 mls. methanol were heated at reflux for 2 hours in a 2 liter reaction vessel. The volatile components were then removed by distillation as the temperature was increased to 175° C. As the last traces of solvent were being removed, the product solidified into a gel-like consistency and could not be processed further. This illustrates the use of a mole ratio of B:Ca which is too high to lead to a satisfactory detergent concentrate.

2:1 ratio.—Similar to above, 300 grams of the same overbased sulfonate were mixed with 15.4 grams Ca$(OH)_2$, 25.8 grams $H_3BO_3$, 26.1 grams diluent oil and 300 mls. isooctane plus 100 mls. methanol. These were heated at reflux for 2 hours and the volatile components removed. An additional 352 grams of diluent oil were added during solvent removal to maintain a fluid consistency. After heating at 180° C. for 0.5 hour to remove final traces of solvent, 10 grams of diatomaceous earth were added to aid in the filtration which followed. The filtrate was 699 grams of an oil solution containing ~25% by wt. detergent concentrate of calcium borate-carbonate overbased calcium sulfonate (15:1) containing 6.5% Ca, and 0.62% B. This illustrates that using a 2:1 ratio of $H_3BO_3$ to Ca$(OH)_2$ can lead to the detergent materials of this invention.

1:1 ratio.—A reaction mixture consisting of 300 grams of a 12:1 $CaCO_3$ overbased Ca sulfonate described above, 27.8 grams Ca$(OH)_2$, 23.2 grams $H_3BO_3$, 341 grams diluent oil along with 450 mils. isooctane and 150 mls. methanol was heated at reflux for 1 hour, after which $CO_2$ was introduced at 500 mls./min. for 1.5 hours. The mixture was then heated to 180° C. to remove volatile matter, admixed with 7 grams of filter aid (diatomaceous earth), and filtered. The filtrate weighed 641 grams. This product was a ~25% concentrate of a calcium borate-carbonate overbased calcium sulfonate containing 7.3% calcium and 0.55% boron. This reaction illustrates that the products of this invention can be formed utilizing an approximate 1:1 mole ratio of boric acid and calcium hydroxide.

1:2 ratio.—A mixture of 300 grams of a 12:1 $CaCO_3$ overbased calcium sulfonate described above, 40.4 grams Ca$(OH)_2$, 23.2 grams $H_3BO_3$, 358 grams diluent oil along with 450 mls. isooctane and 150 mls. methanol were heated at reflux for one hour. Then carbon dioxide gas was bubbled in at 500 ccs./minute for two additional hours. In the course of stripping out the volatile materials the reaction mixture formed an unfilterable solid and could not be processed further. This run illustrated that a lower limit of B:Ca mole ratio had been reached and products could not be formed at this 1:2 ratio.

I claim:
1. A process for converting a filterable colloidal dispersion of an alkaline earth metal carbonate overbased alkaline earth metal sulfonate in lubricating oil to a colloidal dispersion of alkaline earth metal borate-carbonate overbased alkaline earth metal sulfonate of an increased filterable alkaline earth metal ratio comprising forming a lubricating oil mixture containing a colloidal like dispersion of an alkaline earth metal carbonate overbased alkaline earth metal sulfonate of an alkaline earth metal ratio of between about 2:1 and 18:1, boric acid, and an alkaline earth metal hydroxide, heating the mixture to a temperature of between about 50 and 150° C., contacting the heated mixture with a stoichiometric excess of carbon dioxide in respect to alkaline earth metal hydroxide and boric acid and subsequently recovering said lube oil composition containing said colloidal dispersion of overbased sulfonate having a filterable alkaline earth metal ratio greater than the initial overbased sulfonate, said boric acid initially present in a mole ratio range of boric acid to alkaline earth metal hydroxide of between about 2:1 and 1:2 and in an amount in said range which will not render the final reaction mixture unfilterable.

2. A method in accordance with claim 1 wherein said alkaline earth metal is calcium, said mixture also includes volatilizable diluent selected from the group consisting of liquid hydrocarbons, liquid alkanols and mixtures thereof, and said recovery comprises removing the volatilizable materials via distillation followed by filtering the crude product to recover the overbased boronated sulfonate alkaline earth metal sulfonate of increased alkaline earth metal ratio.

3. A process in accordance with claim 2 wherein said volatilizable diluent is a mixture of isooctane and methanol, said recovery also includes the step of washing the filter cake resulting from said filtration with said volatilizable diluent followed by evaporating said volatilizable diluent leaving additional amounts of said lube composition containing said overbased sulfonate of increased alkaline earth metal ratio in colloidal-like dispersion in said lubricating oil.

References Cited
UNITED STATES PATENTS 3,480,548  11/1969  Hellmuth et al. _____ 252—33
2,616,904  11/1952  Asseff et al. _____ 252—33

DANIEL E. WYMAN, Primary Examiner

I. VAUGHN, Assistant Examiner